Figure 1:
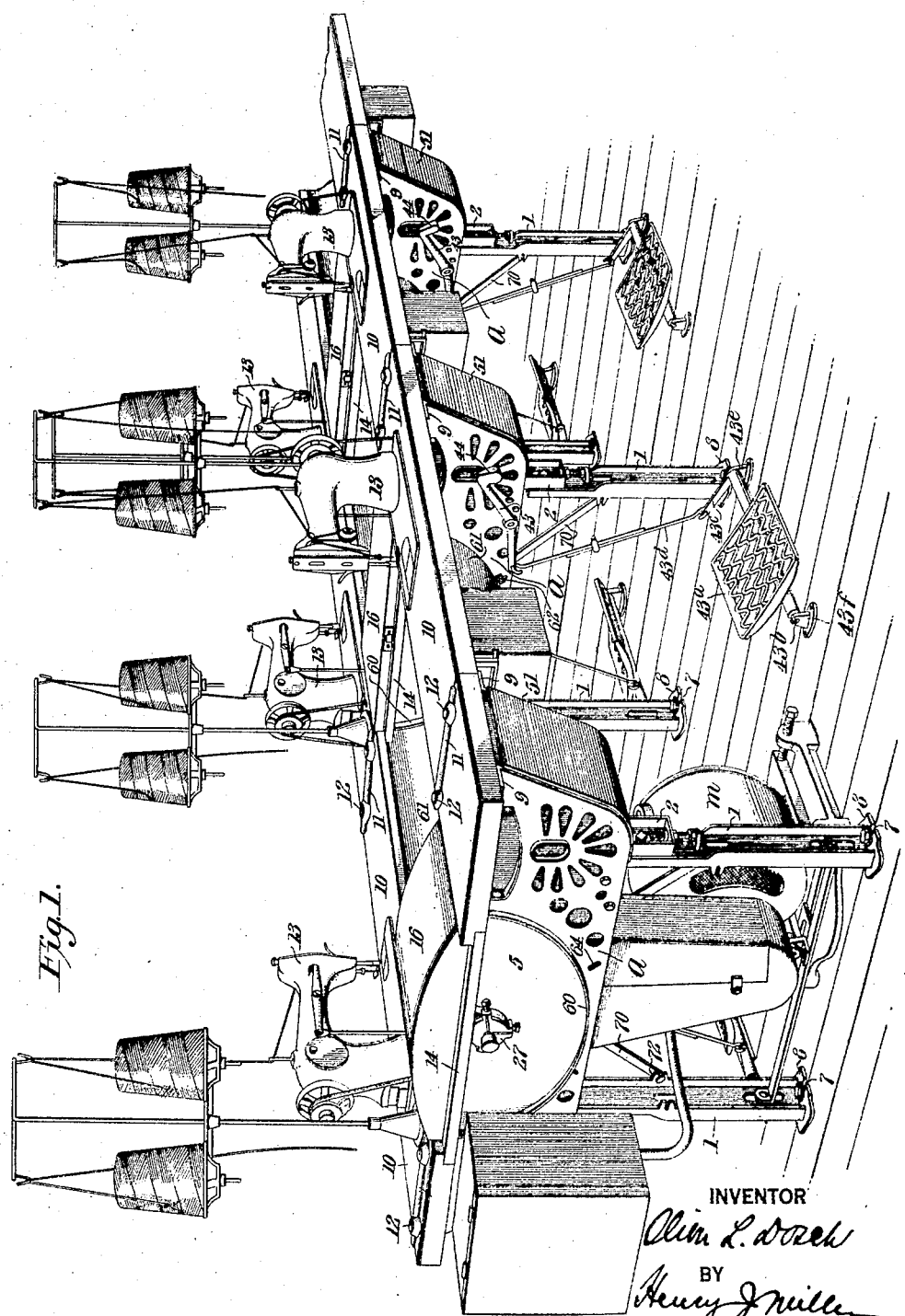

April 14, 1925.

O. L. DOSCH 1,533,170

POWER TABLE

Filed June 6, 1917 5 Sheets-Sheet 1

INVENTOR
Oliver L. Dosch
BY
Henry J. Miller
ATTORNEY

April 14, 1925.

O. L. DOSCH 1,533,170

POWER TABLE

Filed June 6, 1917

5 Sheets-Sheet 2

April 14, 1925.

O. L. DOSCH 1,533,170

POWER TABLE

Filed June 6, 1917    5 Sheets-Sheet 3

INVENTOR
Oliver L. Dosch
BY
Henry J. Miller
ATTORNEY

April 14, 1925.
O. L. DOSCH
POWER TABLE
Filed June 6, 1917
1,533,170
5 Sheets-Sheet 4
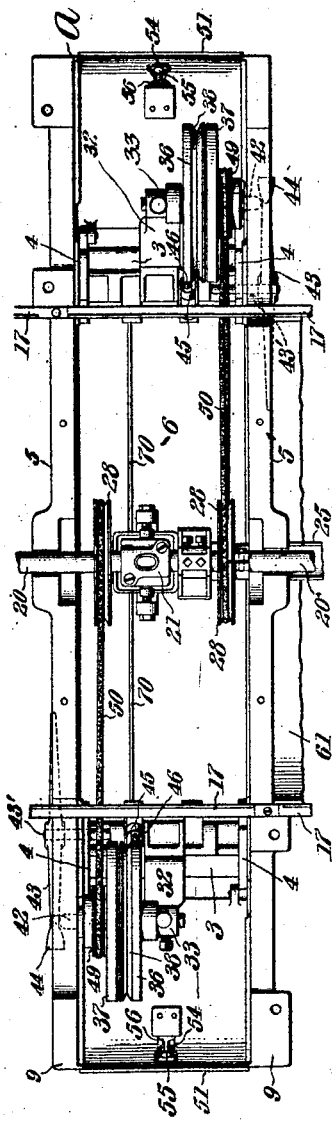
INVENTOR
Olive L. Dosch
BY
Henry J. Miller
ATTORNEY

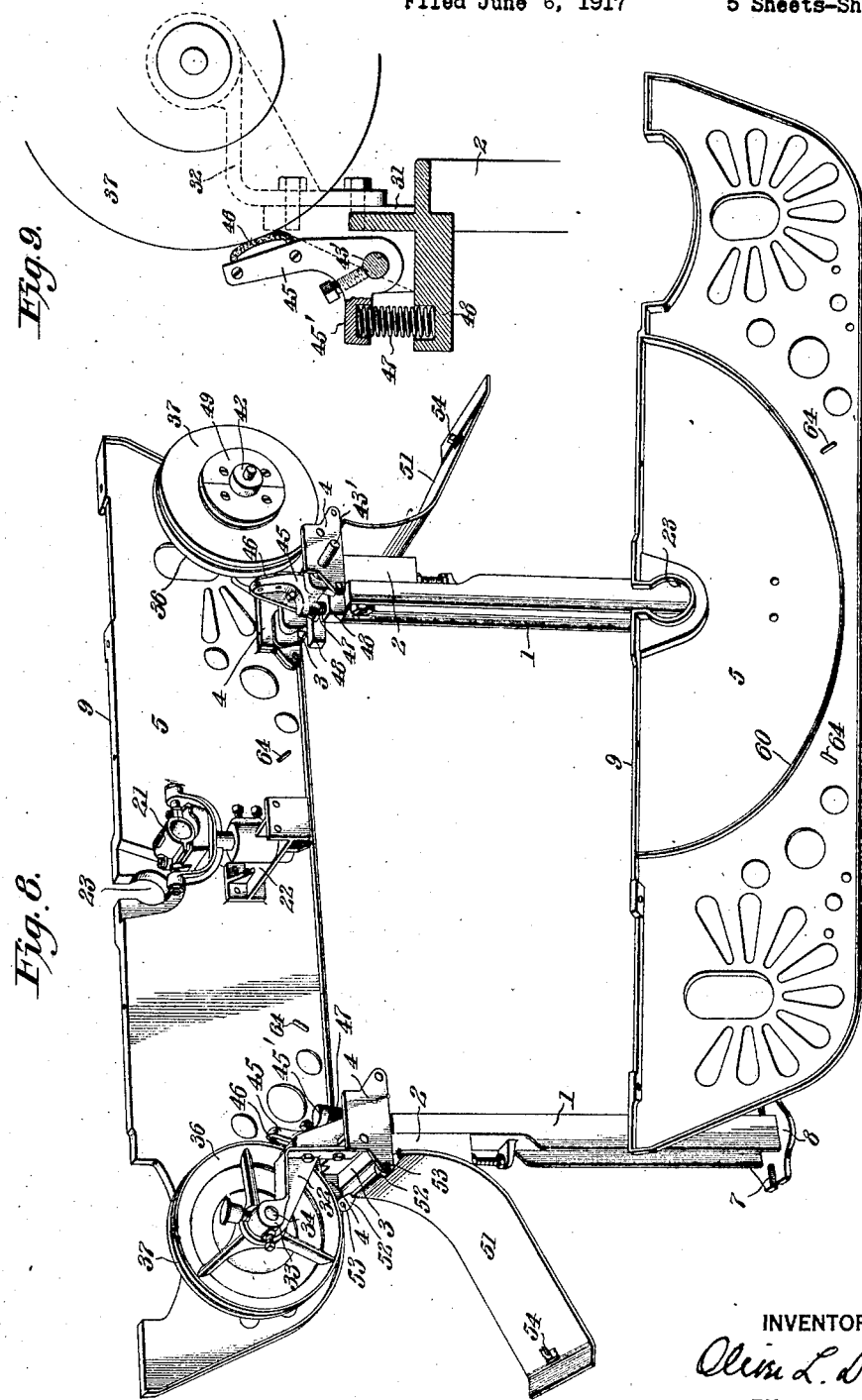

Patented Apr. 14, 1925.

1,533,170

UNITED STATES PATENT OFFICE.

OLIVER L. DOSCH, OF ELIZABETH, NEW JERSEY, ASSIGNOR TO THE SINGER MANUFACTURING COMPANY, A CORPORATION OF NEW JERSEY.

POWER TABLE.

Application filed June 6, 1917. Serial No. 173,083.

*To all whom it may concern:*

Be it known that I, OLIVER L. DOSCH, a citizen of the United States, residing at Elizabeth, in the county of Union and State of New Jersey, have invented certain new and useful Improvements in Power Tables, of which the following is a specification, reference being had therein to the accompanying drawings.

This invention relates to power-tables such as used in factories to support sewing or other small machines. In power-table construction, as heretofore practiced, the various pulleys, belts, starting and stopping clutches, etc., constituting the driving mechanism of the table, have been hung in exposed positions beneath the table-top, thereby becoming a source of annoyance and danger to the operatives because of the oil which is thrown from the pulleys, clutches, etc., and because of the ease with which the clothing of an operative may become entangled with the exposed moving parts below the table. Many serious accidents have in the past resulted from faulty power-table construction, and there has long been a want for a power table which will meet the modern demands of safety and efficiency.

The primary object of the invention, therefore, is to provide a power-table of simple construction wherein all moving parts are substantially enclosed. More specifically the invention has for an object to so construct a power-table that all moving parts may be enclosed without recourse to the use of readily detachable dress-guards, shields, or the like, which experience has taught are seldom replaced after having been removed by an operative to expose a moving part needing adjustment or repair.

Another object of the invention is to provide a power-table of such construction that ready access may be had to the various driving pulleys, shaft-bearings and other moving parts thereof for various purposes such as oiling, adjusting, pulley-changing and the like.

A further object of the invention is to provide a power-table of indefinite length which may be built up very largely by the use of duplicate parts and which will possess great rigidity and offer great resistance to racking tendencies.

Still further, the invention has for an object to provide a power-table of which the parts are supported well above the floor to provide plenty of space for sweeping purposes.

To gain the above and other objects, as will hereinafter appear, the present power-table construction comprises, in its preferred embodiment, a row of supporting units or frames each of which includes a pair of spaced supporting legs carrying an elongated, laterally closed housing which extends crosswise of said row. A series of table-top elements or boards carried by said supporting sections, serve to support the machines to be driven in two rows, adjacent the opposite edges of the table. The driving mechanism of the table comprises a power-shaft which extends lengthwise and centrally thereof at an elevation slightly below the level of the table-top and is journaled in bearings disposed within said housings. Power-transmitting mechanism including driving pulleys, belts, and clutch devices are mounted mainly within said housings and serve to connect the power-shaft with the machines to be driven.

Figure 2:
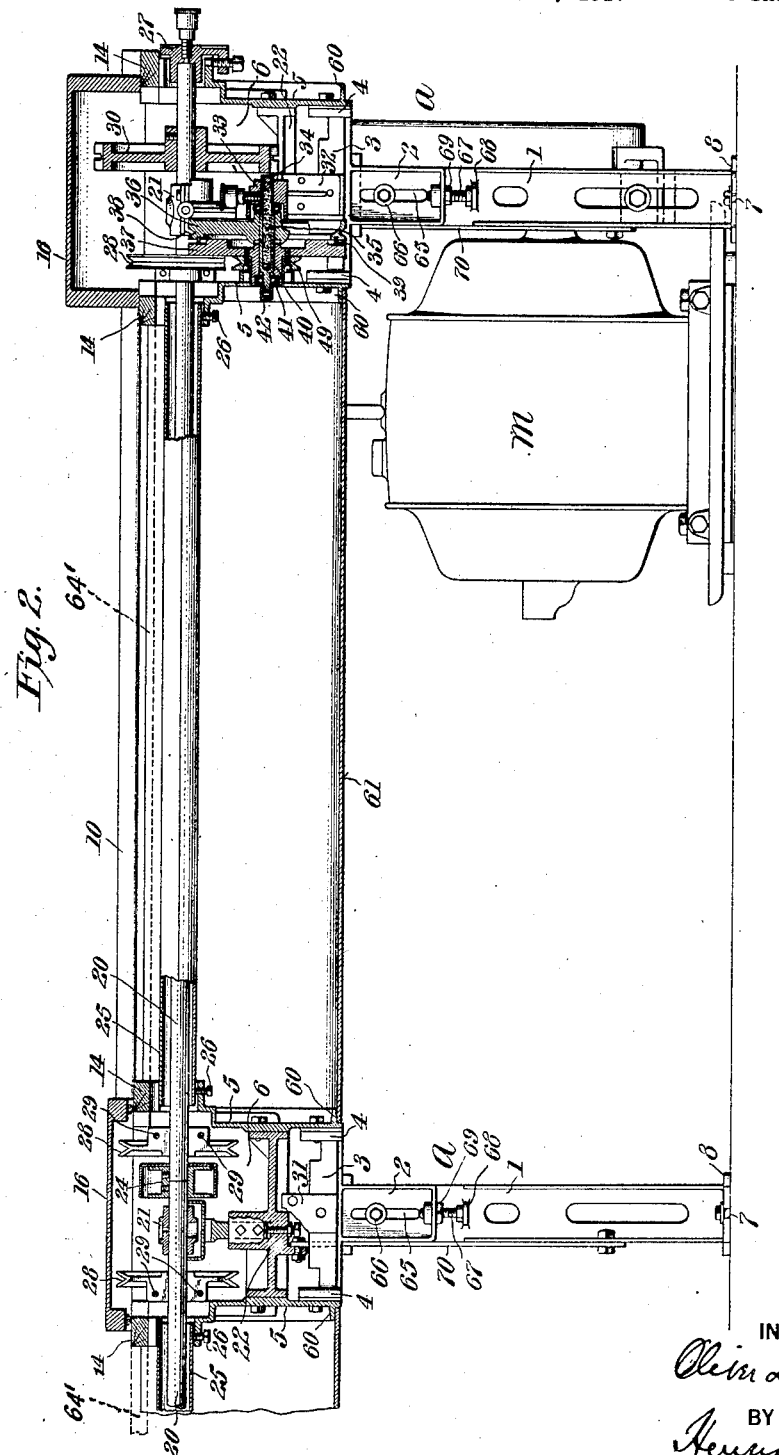
Figure 3:
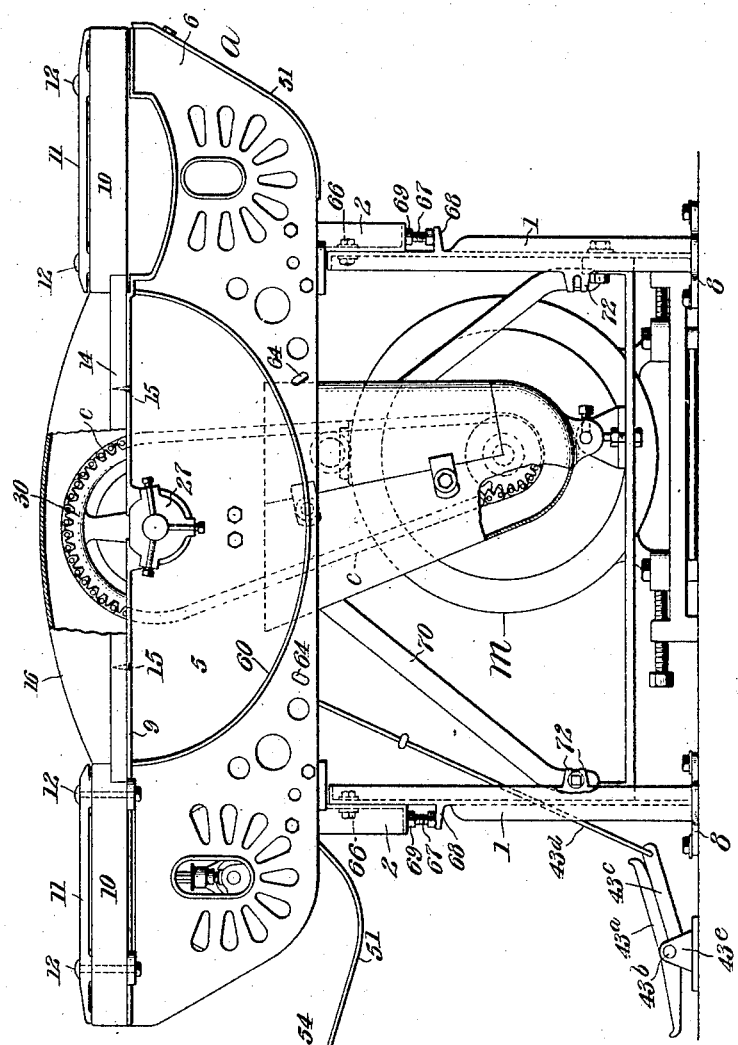
Figure 4:
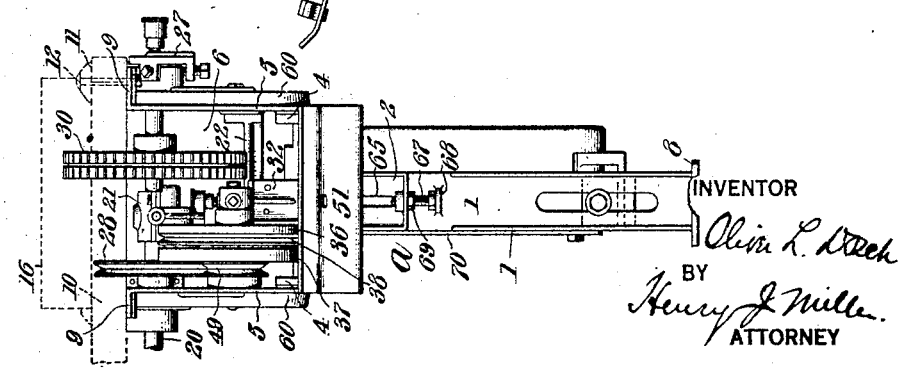

A better understanding of the invention may be had by referring to the accompanying drawings in which Fig. 1 is a perspective view of the power-table complete. Fig. 2 is a longitudinal vertical section through the power-table. Fig. 3 is an end elevation of the power-table showing a supporting unit in side elevation. Fig. 4 is an end elevation of the end supporting unit shown in Fig. 3. Fig. 5 is a side view of an intermediate supporting unit with one of the side wall members removed and with the top boards in section. Fig. 6 is a top plan view of an intermediate supporting unit. Fig. 7 is the perspective view showing a detail of construction. Fig. 8 is a perspective view of an intermediate supporting unit partially disassembled, and Fig. 9 is a cross-section showing a detail of the power-transmitter brake-lever.

In the preferred embodiment of the invention, as illustrated, the power-table is designed to be built up of any desired length and comprises two or more similar supporting units or frames A each of which preferably comprises a pair of duplicate leg members 1—1 to the upper ends of which are bolted the shanks 2—2 of duplicate T-shaped spacers or cross-bars 3—3 to whose opposite flanged extremities 4—4 are bolted the duplicate side-wall members 5—5 forming a laterally closed housing 6 within which various driving sections to be hereinafter described are housed. The supporting units A are preferably arranged in a row, so that the housing 6 of each supporting unit extends cross-wise of the direction of extent of the row, and are firmly secured to the floor by means of bolts or the like which pass through slots 7 in the flanged bases 8 of the legs 1.

The top edge-portions of the side-wall member 5 are flanged at 9 to afford seats or rests for the top boards 10 which extend longitudinally at each side of the table and bridge the space between adjacent ends of adjacent housings 6. Cleats 11 and bolts 12 may be used to clamp the abutted ends of the top-boards 10 against the flanges 9 of the side-wall member 5. The top-boards 10 are adapted to support the machines 13 to be driven and may be apertured as usual to receive the bases of the machines. Narrow spacer-strips 14 of about one-half the thickness of the top-boards 10 are secured by screws 15 to the upper sides of the flanges 9 as shown in Figs. 1 and 3, and cover-boards 16 are provided to rest upon the spacer-strips 14 and close the upper sides of the housings 6 between the parallel series of top-boards 10, as shown best in Fig. 1. Small angle irons 17, Figs. 5 and 6, extending lengthwise of the table and secured to the tops of the housings 6 are, in the present instance, used as tie-rods to fix the distance between adjacent housings and to steady the table.

The driving mechanism incorporated in and forming a part of the power-table comprises a power-shaft 20 which extends lengthwise and centrally of the table and through the housing 6. The shaft 20 is journaled at an elevation slightly below the level of the top-boards 10 in suitable self-alining shaft-bearings 21 which may be mounted upon spacers 22 to whose flanged extremities are bolted the inner surfaces of the opposed side-wall members of the housings 6.

It will be noted that the side-wall members 5 are apertured at 23 to accommodate the main-shaft 20 and that the apertures 23 open through one adjacent edge of the respective members 5. By virtue of this construction, the shaft may be readily placed in or removed from operative position as by lowering or lifting it through the open sided apertures 23 rather than by sliding it endwise through said apertures. The presence of building walls adjacent the ends of the table has, therefore, no effect upon the facility with which the table may be assembled. The shaft 20 may be made in one piece or it may be made in sections which are secured together by suitable shaft-couplings such as shown at 24. Tubular shaft-guards 25 are rigidly secured at their opposite ends by set-screws 26 within the apertures 23 and are adapted to cover the portions of the shaft 20 extending between adjacent housings 6. These tubes further serve to steady the housings against lateral tilting movements. A thrust bearing 27 may be provided at either end of the shaft 20.

Secured to the main-shaft 20 are driving elements or pulleys 28 which may, if desired, be made in two parts and clamped to the shaft by means of bolts 29 or the like. Preferably, two of these pulleys are mounted within each of the housings with the exception of the end housing where but one will be needed. The main-shaft 20 may be driven by any suitable means such as an electric motor $m$ which may be connected by means of a chain $c$ to a sprocket-wheel 30 mounted on the shaft 20 within one of the end units A.

In the present instance, each of the T-shaped spacer-bars 3 is formed with a vertically disposed seat 31, Fig. 2, to which is screwed the base of a bracket 32 whose extremity is formed with an apertured boss 33 within which is fixedly secured the slightly reduced end 34 of a tubular bearing pin 35 upon which is journaled a driven pulley 36 and a driving disk 37. The driven pulley 36 is peripherally grooved at 38 to adapt it to be belt-connected to one of the machines 13 and is provided with a friction ring 39 of leather or other suitable material. The driving disk 37 is made relatively heavy in order that its momentum may be utilized to quickly start the machine connected to the pulley 36 and is formed at the side nearer said pulley 36 with a driving surface which may be pressed into engagement with the friction-ring 39 to establish driving connection between the machine and the source of power. The driving disk 37 is formed with a hub 40 within which is fitted a ball thrust-bearing 41 against which a cap member 42, surrounding and slidable lengthwise upon the reduced and closed free extremity of the stationary tubular bearing shaft 35, is adapted to be pressed to shift the driving disk into engagement with the driven pulley.

Manually controlled means comprising preferably a treadle operated lever 43 having a cam-faced extremity or head 44 is provided to force the cap-member 42 endwise to establish driving relation between the members 36 and 37. The lever 43 is fixed to a fulcrum-shaft 43′ which is journaled in suitable bearing lugs carried by the spacer-bar 3, Fig. 8, and to which is fixed a bellcrank brake-lever whose vertically disposed arm 45 carries a friction pad 46 which is adapted to be pressed into engagement with the periphery of the driven disk 36 when the pressure upon the treadle is relieved. The horizontal arm 45' of the brake-lever is forced upwardly by means of the expansion spring 47 disposed intermediate the free end of said arm and one of the supporting lugs 48 sustained by the spacer-bar 3. Detachably secured to the exposed or outer face of the driving disk 37 are two sections of a split pulley 49 which is connected to a corresponding one of the driving pulleys 28 by a belt 50. Pulleys 49 and 28 may, therefore, be readily removed and pulleys of other sizes substituted therefor in case it is desired to change the speed of a particular machine carried by the table.

The treadle mechanisms preferably employed for actuating the levers 43 each comprise a flat treadle plate 43$^a$ fixed to a relatively long treadle rock-shaft 43$^b$ to one end of which is fixed an arm 43$^c$ which is spaced from the treadle plate and at its free end is connected to a treadle-rod 43$^d$ depending from the lever 43. The end of the rock-shaft 43$^b$ adjacent the arm 43$^c$ is reduced and fitted within a circular aperture in the pedestal 43$^e$. The opposite reduced end of the rock-shaft 43$^b$ rests within an open-topped aperture in the pedestal 43$^f$. The treadle-plate and rock-shaft may therefore be quickly and easily removed from its supporting pedestals and stood against a leg member 1 when it is desired to clear the floor for sweeping purposes. Pressure upon the treadle-plate will not tend to lift or tilt the end of the shaft 43$^b$ out of the open-topped bearing in the pedestal 43$^f$ as in certain prior constructions wherein the treadle-rod is secured to one corner of the treadle-plate thus rendering it necessary to confine both ends of the treadle rock-shaft against upward displacement.

Guards 51 are provided to close the opposite ends of the housings 6 and shield the operatives from oil which may be thrown outwardly by the transmitters, and to permit ready access to the space within the ends of said housings. The guards 51 are preferably made up in the form of sheet-metal doors carrying spaced ears 52 at their lower edges. The ears 52 are journaled upon pivot or hinge-pins 53 which project inwardly from the flanges 4 of the spacer-bars 3, as shown in Fig. 8. The guards 51 are thereby adapted to swing downwardly from closed position to expose the transmitters, and the parts associated therewith. Secured to each guard 51 is a spring clip 54 whose yielding extremities are adapted to snap over and grip the cylindrical lug 55 formed at the lower forwardly projecting extremity of a bracket 56 screwed to the under side of the table-top.

It is often desirable to provide power-tables of the class described with work-receiving troughs adapted to catch the finished or stitched work after it has passed through the machines. Preferably to this end, each of the side-wall members 5 is formed on its outer face with a semi-elliptical rib 60 against the convexed side of which a trough 61 of suitable thin sheet material, such as veneer, is placed and held in position by means of small angle pieces or clips 62 which are secured to the side-wall members 5 by means of small screw bolts 63, or the like, Fig. 5, and are adjustable lengthwise of the slots 64 in order that the clips 62 may be pressed firmly against the troughs 61 before being tightened to position. The upper edges of the troughs 61 are adapted to rest against the inside surfaces of the angle irons or tie-rods 17, as shown in Fig. 5. Thus the troughs 61 may be readily removed from or replaced in operative position without disturbing any of the other parts of the table. In case a table of the center trough type is not desired, flat cover-boards 64', or the like, Fig. 2, may be substituted for the spacer-strips 14 to close the space above the troughs 61.

An adjustment between the legs 1 and shanks 2 of the spacers 3 is provided to facilitate accurate leveling of the table and to compensate for irregularities in the floor whereon the table is to be erected. Referring to Figs. 2 and 3 it will be seen that the shanks 2 are slotted at 65 to receive the bolts 66 which serve to draw the shanks tightly against the legs 1. Threaded into the bottom ends of the shanks 2 are adjusting screws 67 whose heads rest against lugs 68 projecting from the legs 1. By slightly loosening the bolts 66 and turning the adjusting screws 67 the elevation of the table or any part thereof may be readily adjusted, after which the bolts 66 are tightened. The screws 67 are provided with the usual lock-nuts 69.

Leg braces 70, Fig. 5, while not necessary, may be provided to prevent possible spreading of the lower ends of the legs 1 or tilting of the legs 1 laterally of the length of the table. In the present instance the leg braces 70 are made up in the form of inverted V-shaped rods whose apices are bolted to downwardly projecting slotted ears 71 carried by the central spacers 22 and whose extremities are bolted to laterally projecting slotted ears 72 formed on the legs 1. The leg braces are supported well above the floor and do not obstruct the space below the table-top to any appreciable extent.

The housings 6 are made wide enough to accommodate both a right and left-hand transmitter at either end thereof, should it be desirable to drive both a right and left-hand machine from one end of a given housing. The spaced flanges 9 of the side wall members 5 being bolted at diagonally opposed corners, Fig. 1, to the under side of the top-boards 10, act to further stiffen the entire table against endwise racking. From the above description it will be seen that the power-table may comprise any desired number of power-table sections, each of which may be considered as comprising two supporting units or frames A together with the top-boards, tie-rods, &c., bridging the space therebetween.

While I have shown and described in detail the preferred embodiment of the invention I do not wish to be limited to the precise form and arrangement of parts shown. The present embodiment is obviously susceptible of material modification within the spirit and scope of the invention.

Having thus set forth the nature of the invention, what I claim herein is:—

1. A power-table for factory machines comprising, a table-top supporting framework including supports and a plurality of laterally closed housings superposed upon said supports, a power-shaft extending through said housings, power-transmitters including clutch and brake mechanisms mounted within said housings forwardly of and operatively connected with said power-shaft, and means for controlling the operation of said transmitters to start and stop the machines driven thereby.

2. A power-table for factory machines comprising, a table-top supporting framework including supports and a plurality of spaced laterally closed housings superposed upon said supports, a table-top carried by and bridging the space between said housings, a driving shaft extending lengthwise of said table-top and through said housings, power-transmitters including clutch and brake mechanisms mounted within said housings forwardly of and operatively connected with said driving shaft, and means for controlling the operation of said transmitters to start and stop the machines driven thereby.

3. A power-table for factory machines comprising, a series of supports each of which comprises supporting legs and an elongated laterally closed housing carried thereby, a table-top carried by said supports and extending crosswise of said housings, a power-shaft, power-transmitting mechanism mounted within said housings and including clutch and brake devices separate from and operatively connected with said power-shaft, and manually operated means for controlling the operation of said power-transmitting mechanism.

4. A power-table comprising supporting legs spaced laterally closed housings carried directly by said legs, a table-top carried by said housings, a power-shaft carried by and extending through said housings, a plurality of machines to be driven sustained by said table-top and driving connections including manually controlled power-transmitters between said power-shaft and said machines disposed mainly within said housings.

5. A power-table comprising a series of spaced supports disposed in a row and comprising power transmitter housings constructed with side-wall members disposed substantially in parallelism and crosswise of said row, troughs extending between adjacent side-wall members of adjacent supports, and top-boards carried by said supports and disposed alongside said troughs.

6. A power-table comprising a pair of supporting units, table-top members supported by and bridging the space between said units, said units including side-wall members which are provided externally with ribs, a trough extending between said units and at its opposite ends fitted to said ribs, and means for holding the ends of said trough in position.

7. A power-table for factory machines comprising, a pair of spaced supporting units, table-top members carried by and bridging the space between said units, a power-shaft carried by said units, and a tubular shaft-guard surrounding said power-shaft and at its opposite ends fixed to said units, whereby said shaft-guard serves as a tie-rod to maintain the spaced relation of said units and to stiffen the table.

8. A power-table comprising a plurality of leg-members, elongated power transmitter housings carried by said leg-members and including spaced side-wall members, said side-wall members being each provided near one of its edges with a power-shaft clearance aperture open to such edge, a power-shaft extending through said apertures, and bearings for said power-shaft disposed within said housings.

9. A power-table comprising a series of supporting legs laterally closed housings sustained by said legs and arranged side-by-side in spaced relation, table-top members carried by and arranged transversely of said housings, a power-shaft extending lengthwise of said table and through said housings, driving elements carried by said power-shaft within said housings, power-transmitting clutch and brake mechanisms sustained within said housings, and operative connections between said driving elements and said mechanisms.

10. A power-table section comprising a pair of spaced supporting units each of said units including legs and spaced side-wall members, a trough extending between said supports and terminating adjacent certain of said side-wall members, top-boards carried by said supports and disposed alongside of said trough, a power-shaft disposed within said trough and extending through said side-wall members, and power transmitting devices carried by said supports and disposed between the side-wall members thereof.

11. A power-table support comprising a pair of side-wall members, a plurality of spacers disposed between said side-wall members and serving to connect them together to form a laterally closed housing, a power-shaft bearing carried by one of said spacers, manually controlled starting and stopping devices carried by others of said spacers within the opposite end-portions of said housings and supporting legs connected to said last mentioned spacers.

12. A supporting unit for power-tables comprising, a pair of duplicate leg members, a pair of duplicate spacer-bars secured each to a respective leg member, and a pair of duplicate side-wall members secured to the opposite ends of said spacer-bars, thereby forming a laterally closed housing, and power-transmitting mechanism supported mainly within said housing.

13. A power-table for factory machines comprising, a plurality of supporting units including elongated housings, a table-top carried thereby, power-transmitters including clutch and brake devices mounted within the opposite ends of said housings, a power-shaft extending through and crosswise of said housings, and driving means carried by said power-shaft within each of said housings and disposed between the power-transmitters housed therein.

14. A power-table for factory machines, comprising, a plurality of supporting units including elongated housings, a table-top carried thereby, a power-shaft, power transmitters including clutch and brake devices mounted within said housings independently of and operatively connected with said power-shaft, each of said power-transmitters including a shiftable element projecting through its respective housing, and a treadle actuated lever mounted externally of said housing and adapted to act upon said element.

15. A power table comprising a plurality of table-top supporting framework units each including a pair of legs, spacers carried by said legs and parallel side-wall members connected together by said spacers to form laterally closed housings, a power-shaft passing through said housings, and manually controlled power-transmitters mounted in said housings and connected to be driven by said shaft.

In testimony whereof, I have signed my name to this specification.

OLIVER L. DOSCH.